United States Patent [19] [11] 3,749,956
Reiss [45] July 31, 1973

[54] ELECTRIC MOTOR STATOR

[75] Inventor: Leon G. Reiss, Springfield, Ohio

[73] Assignee: Robbins & Myers, Inc., Springfield, Ohio

[22] Filed: Dec. 27, 1971

[21] Appl. No.: 212,382

[52] U.S. Cl. .................................. 310/216, 310/254
[51] Int. Cl. ............................................. H02k 1/06
[58] Field of Search .................... 310/254, 258, 259, 310/216, 218, 187

[56] References Cited
UNITED STATES PATENTS
2,715,690 8/1955 Neuenschwander ............ 310/259 X
2,298,388 10/1942 Knobel ............................... 310/259
3,643,118 2/1972 Ichiki et al ...................... 310/187 X Primary Examiner—D. F. Duggan
Attorney—William R. Jacox et al.

[57] ABSTRACT

A salient pole stator for an electric motor of the universal or direct current type. The stator has a field yoke area at a maximum for the flux paths and maximum slot area for windings. Thus, in consideration of the physical dimensions of a stator of this invention, greater performance characteristics and greater efficiency are possible than are possible in known salient pole stators. Thus, an electric motor of a given rating can be constructed in accordance with this invention in a smaller physical size than known motors.

8 Claims, 1 Drawing Figure

PATENTED JUL 31 1973　3,749,956
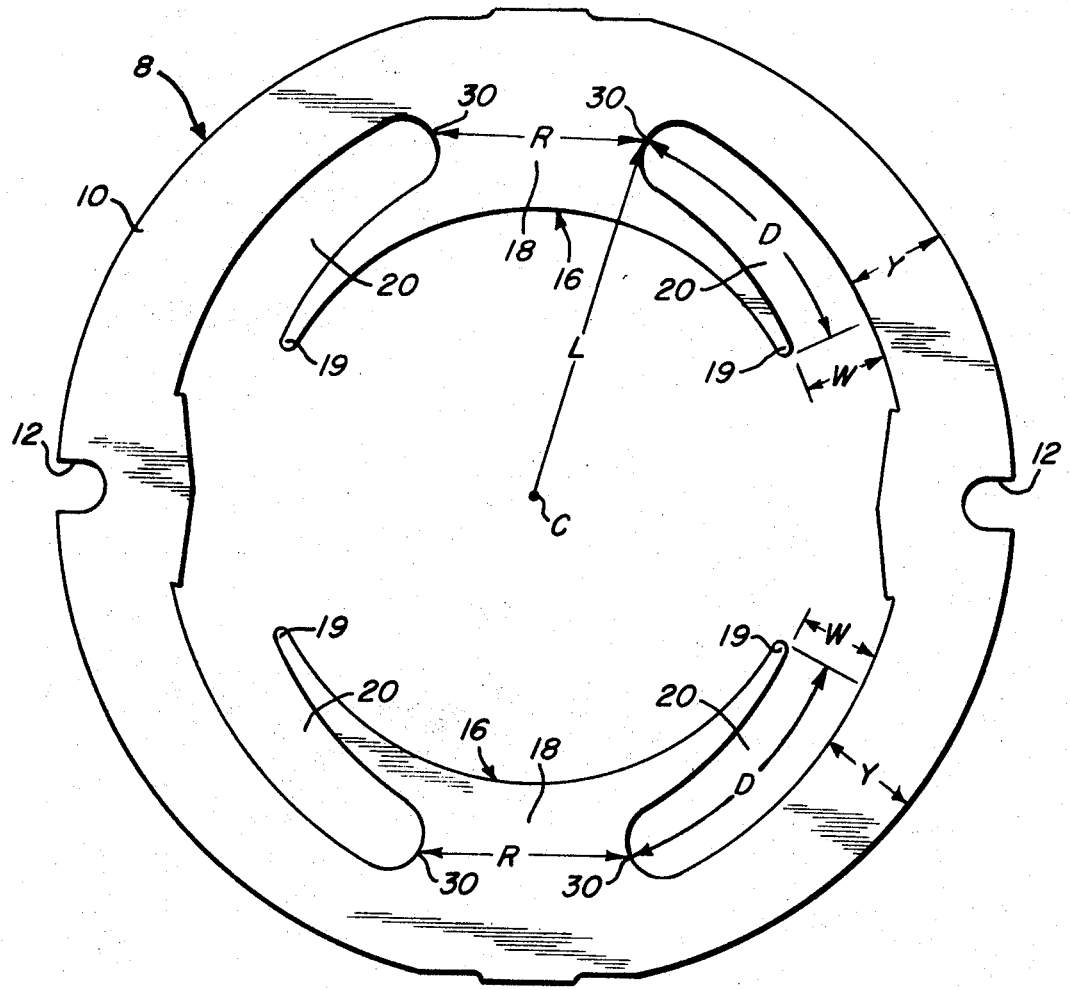

3,749,956

ELECTRIC MOTOR STATOR

BACKGROUND OF THE INVENTION

Numerous attempts have been made to provide a motor of the direct current or universal type which has given performance characteristics but which can be constructed in a smaller physical size.

Stators such as those shown in U.S. Pat. Nos. 2,631,251 and 3,366,812 are known. However, it is believed that equal performance characteristics are possible in a smaller physical size by use of a stator of this invention.

An object of this invention is to provide a stator for a motor of the universal or direct current type in which maximum performance characteristics can be obtained in a motor of a given physical size.

Other objects and advantages reside in the construction of parts, the combination thereof, the method of manufacture, and the mode of operation, as will become more apparent from the following description.

BRIEF DESCRIPTION OF THE DRAWING

The FIGURE of the drawing is an end view of a stator made in accordance with this invention.

DETAILED DESCRIPTION OF THE INVENTION

A stator 8 of this invention as shown in the FIGURE of the drawing comprises a plurality of coaxial laminations, each of which has an annular yoke 10. At the periphery of the yoke 10 are notches 12, which are adapted to receive bolts or the like, not shown, for attachment of the stator to a housing or the like.

Extending inwardly from the yoke 10, and shown at diametrically opposed positions are poles 16, each of which has a root portion 18, joined to the yoke 10, and a pair of arcuate tip portions 19. Each of the tip portions 19 extends from the root portion 18 in decreasing width and in spaced relationship from the yoke 10, so that an elongate arcuate slot 20 is formed between each tip portion 19 and the portion of the yoke 10 adjacent thereto. Each slot 20 has an unusual depth to width ratio. Each slot 20 has a depth dimension D which is at least approximately three times the maximum width dimension W thereof. The yoke 10 has a width which gradually decreases toward the bottom of its adjacent slot 20, and the width of each slot 20 gradually decreases toward the bottom thereof. Each portion of the yoke 10 has a width Y adjacent each slot 20 which is equal to at least 1.1 times the width of the adjacent portion of the slot 20. The depth D of each slot 20 is at least 1.25 times the width R of the root portion 18 of the poles 16. Furthermore, preferably, the distance L from the center C of the yoke 10 to the deepest part of each slot 20, indicated by reference numeral 30, is a maximum of 1.37 times the depth of each slot 20.

The exterior surface of the yoke 10 adjacent each slot 20 is arcuate about the center C of the yoke 10. The inner surface of the yoke 10 adjacent each slot 20 is arcuate about a point spaced from the center C of the yoke 10. The surface of the tip portion 19 which also serves as a surface of the slot 20 is arcuate about another point spaced from the center C of the yoke 10. The inner surface of the pole 16 is arcuate about the center C and is joined to the surfaces of the pole tip portions 19 which are arcuate about other points spaced from the center C of the yoke 10.

As a result of these relative dimensions and shapes, maximum field yoke areas and maximum area for coil windings, not shown, are provided. Thus, maximum flux is obtained per unit of magnetomotive force. The width of the yoke 10 is a maximum for flux paths, because the width of the slots 20 is minimum. The pole tips 19, being defined by a large radius, provide improved field performance. Therefore, the physical dimensions of a stator constructed according to this invention can be less than the physical dimensions of a conventional stator having the same efficiency and output characteristics.

Although the preferred embodiment of the stator has been described, it will be understood that within the purview of this invention, various changes may be made in the form, details, proportion and arrangement of parts, the combination thereof, and mode of operation, which generally stated consist in a stator capable of carrying out the objects set forth, as disclosed and defined in the appended claims.

The invention having thus been described, the following is claimed:

1. In an electric machine, a magetizable stator core including an annular yoke having a central axial opening, a plurality of pole pieces within the opening, each pole piece having a root portion joined to the yoke and a pair of generally arcuate tip portions extending from the root portion, there being a slot between each tip portion and the yoke, the slot having a depth which is equal to at least approximately three times the width of the widest portion of the slot, the yoke having a width which gradually decreases toward the bottom of the adjacent slot, the width of each slot gradually decreasing toward the bottom thereof, each portion of the yoke being equal to at least 1.1 times the width of the adjacent portion of the slot, the depth of each slot being at least 1.25 times the width of the root portion of the pole piece, the distance from the center of the stator to the deepest part of the slot being a maximum of 1.37 times the depth of the slot.

2. In a stator for an electric motor, a magnetizable annular yoke provided with a central opening, a plurality of pole pieces, each pole piece having a root portion joined to the yoke and a pair of arcuate tip portions extending from the root portion, there being a slot between each pole tip portion and the yoke, the slot having a depth which is equal to at least approximately three times the width thereof, the width of the yoke at any portion thereof being equal to at least 1.1 times the width of an adjacent portion of the slot, each slot having a depth which is at least 1.25 times the width of the root portion of the pole piece, the distance from the center of the yoke to the deepest part of the slot being a maximum of 1.37 times the depth of the slot.

3. In an electric motor of the type having a stator, the stator including an annular magnetizable yoke, a pair of pole pieces arranged within the yoke at substantially opposed portions thereof, each pole piece having a root portion joined to the yoke, each pole piece having a pair of extending tip portions, each tip portion being spaced from the yoke and forming a slot between the yoke and the tip portion, the slot having a depth which is equal to at least three times the width thereof, the yoke having a width which at each portion thereof is at least 1.1 times the width of the adjacent portion of the slot, the depth of each slot being at least 1.25 times the width of the root portion of the adjacent pole piece, the spacing from the center of the yoke to the deepest part of the slot being a maximum of 1.37 times the depth of the slot.

4. In an electric machine, a magnetizable stator core including an annular yoke having a central axial opening, a plurality of pole pieces within the opening, each pole piece having a root portion joined to the yoke and a pair of generally arcuate tip portions extending from the root portion, there being a slot between each tip portion and the yoke, the slot having a depth which is equal to at least approximately three times the width of the widest portion of the slot, the yoke width adjacent each slot being equal to at least 1.1 times the width of the slot.

5. In an electric machine, a magnetizable stator core, including an annular yoke having a central opening, a plurality of pole pieces within the opening, each pole piece having a root portion joined to the yoke and a pair of generally arcuate tip portions extending from the root portion so that a slot is formed between each tip portion and the yoke, the length of each slot being at least 1.25 times the width of the root portion of the pole piece, the width of the yoke adjacent each slot being equal to at least 1.1 times the width of the slot.

6. An electric machine comprising:
a magnetizable stator core, including an annular yoke having a central opening, a plurality of pole pieces within the opening, each pole piece having a root portion joined to the yoke and a pair of generally arcuate tip portions extending from the root portion so that a slot is formed between each tip portion and the yoke, the distance from the center of the stator to the deepest part of the slot being a maximum of 1.37 times the depth of the slot, the width of the yoke adjacent each lot being equal to at least 1.1 times the width of the yoke.

7. The electric machine of claim 6 in which the slot has a depth which is equal to at least three times the width of the widest portion of the slot.

8. A magnetizable stator core including an annular yoke having a central opening, a plurality of pole pieces within the opening, each pole piece having a root portion joined to the yoke and a pair of generally arcuate tip portions extending from the root portion so that a slot is formed between each tip portion and the yoke, the distance from the center of the stator to the deepest part of the slot being a maximum of 1.37 times the depth of the slot, and the length of each slot being at least 1.25 times the width of the root portion of the pole piece.

* * * * *